United States Patent
Yamabana et al.

(10) Patent No.: US 6,995,896 B2
(45) Date of Patent: Feb. 7, 2006

(54) TILT MIRROR CONTROLLING APPARATUS AND METHOD

(75) Inventors: Tetsuji Yamabana, Kawasaki (JP); Kazuyuki Mori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/823,549

(22) Filed: Apr. 14, 2004

(65) Prior Publication Data

US 2004/0227984 A1  Nov. 18, 2004

(30) Foreign Application Priority Data

May 13, 2003 (JP) ............................. 2003-134527
Feb. 23, 2004 (JP) ............................. 2004-046744

(51) Int. Cl.
*G02B 26/08* (2006.01)
*G02B 26/00* (2006.01)

(52) U.S. Cl. ..................... 359/291; 359/290
(58) Field of Classification Search ............... 359/290, 359/291, 239; 73/514.18, 514.14
See application file for complete search history.

(56) References Cited

U.S. PATENT DOCUMENTS

| 5,277,053 A | 1/1994 | McLane et al. ............... 73/10 |
| 5,629,794 A | 5/1997 | Magel et al. ............... 359/290 |
| 2004/0125431 A1 * | 7/2004 | Mehrl ....................... 359/290 |

FOREIGN PATENT DOCUMENTS

| JP | HEI 2-241380 | 9/1990 |
| JP | HEI 9-101467 | 4/1997 |
| JP | HEI 9-159937 | 6/1997 |
| JP | HEI 10-142529 | 5/1998 |

\* cited by examiner

*Primary Examiner*—Scott J. Sugarman
*Assistant Examiner*—Richard Hanig
(74) *Attorney, Agent, or Firm*—Staas & Halsey LLP

(57) ABSTRACT

The apparatus controls a tilt angle of a tilt mirror in high speed with high stability, realizing non-linearity compensation. The apparatus includes: a control signal producing unit, which produces a control signal, for feed-forward controlling of the mirror into a target tilt angle, based on a parameter that determines the target tilt angle; a digital filter for removing a resonance frequency component, which is caused by an angle response of the tilt mirror, in the control signal, which is produced by the control signal producing unit; and a square root calculating unit for performing digital square-root calculation so that non-linearity of the control signal, from which the resonance frequency component has been removed, is compensated for.

33 Claims, 12 Drawing Sheets

FREQUENCY-GAIN CHARACTERISTICS
(SOLID LINE: MIRROR, BROKEN LINE: FILTER)

STANDARDIZED DRIVING VOLTAGE (SOLID LINE)
STANDARDIZED TORQUE (BROKEN LINE)

TILT MIRROR CONTROLLING APPARATUS AND METHOD

BACKGROUND OF THE INVENTION

1. Field of the Invention

The present invention relates to a method and an apparatus for controlling tilt mirrors, which have been used in optical cross connects, optical add-drop multiplexers, optical routers, etc., in a WDM (Wavelength-Division Multiplexing) system which realizes high-speed, large-capacity data transmission.

2. Description of the Related Art

FIG. 13 is a perspective view in schematic form depicting a previously known optical tilt mirror that is actuated by electrostatic force. This electrostatic force-actuated tilt mirror has a tilt mirror 102 that can rotate about a torsion bar 101 and electrodes (underneath electrodes), 103 and 104, placed under the tilt mirror 102. By changing a voltage applied to the electrodes, 103 and 104, an electrostatic attraction given to the tilt mirror 102 is changed, thereby varying an angle at which the tilt mirror 102 is tilted. Note that such an electrostatic force-actuated tilt mirror is a micro-instrument implemented by MEMS (Micro Electro Mechanical Systems) technology.

Such electrostatic force-actuated tilt mirrors are arranged in array form to realize an optical switch. The number of the tilt mirrors is equal to the number of optical fibers coming in and going out. An optical path between arbitrary input and output optical fibers can be switched by changing the tilt angle of the tilt mirror 102.

When controlling such electrostatic force-actuated tilt mirrors, non-linearity of electrostatic capacity often becomes a problem. Electrostatic attraction is proportional to a value that is obtained by partially differentiating electrostatic energy with respect to a rotation angle, and its torque is given by:

$$\frac{\partial}{\partial\theta}\left(\frac{1}{2}CV^2\right) = \frac{1}{2}\frac{\partial C}{\partial\theta}V^2 \quad (1)$$

Although the non-linearity of electrostatic capacity can be suppressed by improving the construction of the electrodes or by limiting an action range (angle range) of the tilt mirror 102, a significant non-linearity due to the voltage squared term is difficult to control. Therefore, feedback control is utilized, or a square root calculating device in which an operational amplifier is combined with a diode is applied to the voltage, so as to speedup controlling of the tilt mirrors.

FIG. 14 illustrates an example square root calculation device, which is described in the following patent document 1. This square root calculation device is applicable to a control apparatus that performs feedback-control of an electrostatic actuator that exhibits non-linearity (see FIGS. 1 and 2 of the following patent document 1). The device has: a logarithmic calculation circuit 100 including a diode D1, a resistor R1, and an operational amplifier 100a; a ½ times circuit 110 including an operational amplifier 110a; an exponential circuit 120 including a diode D2, a resistor R2, and an operation amplifier 120a. Using an exponential-function-like current-voltage characteristic of the diodes, D1 and D2, the following calculation is performed: $y = \exp(0.5 \times \ln(x)) = \sqrt{x}$ The following patent document 2 discloses a feedback control technique for controlling the position of a sensor unit (movable unit) of an electrostatic acceleration sensor into position zero by electrostatic attraction, so that the non-linearity of such feedback control is avoided or reduced. Specifically speaking, on the basis of a differential signal which depends on a difference between the above movable unit and each of the electrodes sandwiching the movable unit therebetween, an electrostatic attraction of the electrodes is feedback-controlled by a microprocessor, which digitally filters (reducing noises and limiting band frequencies) and amplifies the differential signal, and which obtains the square root of the signal.

Other technologies related to tilt mirrors are disclosed in the following patent document 4 and 5. Moreover, a technology related to a spatial optical modulator is disclosed in the following patent document 3.

[Patent Document 1]
Japanese Patent Application Laid-open NO. HEI 2-241380 (from page 2, upper-right column, line 19 through page 3, upper-right column, line 4, and FIG. 5)

[Patent Document 2]
U.S. Pat. No. 5,277,053 (column 4, lines 10 through 45, and FIG. 1)

[Patent Document 3]
Japanese Patent Application Laid-open NO. HEI 9-101467

[Patent Document 4]
Japanese Patent Application Laid-open NO. HEI 10-142529

[Patent Document 5]
Japanese Patent Application Laid-open NO. HEI 9-159937

The above-described conventional technique has the following problems. First of all, the aforementioned documents 1 and 2 each employ a feedback control technique. In a case where MEMS tilt mirrors (hereinafter simply called MEMS mirrors) are to be controlled, their minuteness makes it difficult to incorporate any mirror angle detecting units therein. In particular, since a number of MEMS mirrors are required to form an optical mirror switch, such angle detecting units prepared, one for each of the MEMS mirrors, will affect practicality and cost performance of the system. In addition, even if such feedback control is successfully applied, thus allowing the tilt mirrors to settle down into their ideal angles sooner than they do by natural attenuation, a significant divergence, if any, from an ideal voltage characteristic delays the settlement.

Further, when a square root calculating device according to the above document 1 is applied, the current-voltage characteristic of a diode is given by the following formula (2), and strictly speaking, this is not an exponential function.

$$I = Ia\left\{\exp\left(\frac{qV}{kT}\right) - 1\right\} \quad (2)$$

Since a significant deviation appears in the vicinity of a voltage of 0 volt, some kind of correction, such as offset adjustment, is required. In addition, since the current-voltage characteristic of a diode is susceptible to temperature, and since variations among individual components need to be considered, the adjustment is required to be performed separately on each of the control objects.

Further, even if square root calculation is applied, it is still impossible to compensate for effects of the non-linearity [angular dependency of a value that is obtained by partially differentiating (angular differentiation) an electrostatic capacity C with respect to a mirror rotation angle θ] of electrostatic capacity against mirror rotation angles. Thus, a residual resonance frequency cannot be sufficiently suppressed.

Here, note that none of the technologies disclosed in the above patent document 3 through document 5 relates to controlling of a tilt mirror, and their features lie in the construction of a mirror itself or the construction of a spatial modulator. It is thus impossible to solve the foregoing problems using these technologies.

SUMMARY OF THE INVENTION

With the foregoing problems in view, it is an object of the present invention to control tilt angles of such tilt mirrors in high speed and with high stability while compensating for the non-linearity of the electrostatic capacity against the mirror rotation angle.

In order to accomplish the above object, according to the present invention, there is provided an apparatus that controls tilting of a tilt mirror, which apparatus comprises: (1) a control signal producing unit that produces a control signal, for feed-forward controlling of the tilting of the mirror, based on a parameter which determines a target tilt angle of the tilt mirror; (2) a digital filter that removes a resonance frequency component, which is caused by movement of the tilt mirror into a desired angle, in the control signal, which is produced by the control signal producing unit; and (3) a square root calculating unit that performs digital square-root calculation so that non-linearity of the control signal, from which the resonance frequency component has been removed, is compensated for.

Here, as a preferred feature, the control signal producing unit includes: a parameter input unit that inputs the parameter as the target tilt angle and driving property information of the tilt mirror; and an arithmetic operation unit that obtains the control signal by arithmetic operation based on the target tilt angle and the driving property information of the tilt mirror, both of which are input by the parameter input unit.

As another preferred feature, the apparatus has two or more electrodes arranged for each of the tilt mirror and a switch that selects, based on the control signal, one of the electrodes to which the control signal is provided. Further, it is preferred that the tilt mirror is an MEMS (Micro Electro Mechanical Systems) mirror.

As a generic feature, there is provided a method for controlling tilting of a tilt mirror, which method comprises the steps of: producing a control signal, for controlling the tilting of the mirror, based on a parameter which determines a target tilt angle of the tilt mirror; removing a resonance frequency component, which is caused by movement of the tilt mirror into a desired angle, from the control signal using a digital filter; and performing digital square-root calculation so as to compensate for non-linearity of the control signal.

Furthermore, the apparatus controls tilting of a tilt mirror that is controlled by electrostatic attraction, and the apparatus comprises: a control signal producing unit that produces a control signal, for controlling the tilting of the mirror, based on a parameter which determines a target tilt angle of the tilt mirror; and a non-linearity compensation calculating unit that performs voltage approximate calculation so as to compensate for non-linearity, in the control signal obtained by the control signal producing unit, of the tilt angle against an electrostatic capacity of the tilt mirror, a driving signal for driving the tilt mirror being thereby produced.

As a preferred feature, the non-linearity compensation calculating unit includes a non-linearity compensation calculating table which stores, as result of such voltage approximate calculation, voltage $V_d$ of the driving signal given by:

$$V_d = \sqrt{\frac{\theta_{max}}{Vc_{max}} V_c \Big/ \alpha\!\left(\frac{\theta_{max}}{Vc_{max}} V_c\right)} \tag{C-4}$$

where $V_c$ represents a voltage of the control signal; $Vc_{max}$ represents a maximal value of the voltage of the control signal; $\theta_{max}$ is a maximal value of the tilt angle.

As another preferred feature, the non-linearity compensation calculating unit further includes: a gain information storing unit that stores gain information, one information item for each of the tilt mirrors having identical construction, each of which information items compensates for a spring constant error of a corresponding one of the tilt mirrors; and again adjusting unit that adjusts an output gain of the non-linearity compensation calculating table based on the gain information stored in the gain information storing unit.

As still another preferred feature, the control signal producing unit has a digital filter that removes a resonance frequency component, which is caused by movement of the tilt mirror into a desired angle. It is preferred that the tilt mirror is an MEMS (Micro Electro Mechanical Systems) mirror, and it is also preferred that such an MEMS tilt mirror has a comb-shaped electrode to receive the driving signal.

As a generic feature, there is provided a method for controlling tilting of a tilt mirror that is controlled by electrostatic attraction, which method comprises the steps of: producing a control signal, for controlling the tilting of the mirror, based on a parameter which determines a target tilt angle of the tilt mirror; and performing voltage approximate calculation so as to compensate for non-linearity, in the control signal obtained by the control signal producing unit, of the tilt angle against an electrostatic capacity of the tilt mirror, a driving signal for driving the tilt mirror being thereby produced.

As another generic feature, there is provided an apparatus which controls tilting of a tilt mirror that is controlled by electrostatic attraction, which apparatus comprises: a control signal producing unit that produces a control signal for controlling the tilting of the mirror; and a pulse waveform compensation unit which controls and compensates for a pulse waveform that appears in initial part of the control signal, which is produced by the control signal producing unit.

As a preferred feature, the apparatus further comprises a band elimination filter, disposed between the control signal producing unit and the pulse waveform compensation unit, which filter removes, from the control signal, a resonance frequency component caused by movement of the tilt mirror into a desired angle and produces a step signal, and the pulse waveform compensation unit controls only the pulse waveform which appears in the initial part of the step signal.

Here, it is preferred that the band elimination filter is a digital filter, and that the tilt mirror is an MEMS (Micro Electro Mechanical Systems) mirror.

As another generic feature, there is provided a method for controlling tilting of a tilt mirror, which method comprises the steps of: producing a control signal for controlling the tilting of the mirror; and controlling and compensating for a pulse waveform appearing in initial part of the control signal which is produced by the control signal producing unit.

In accordance with the present invention, square root calculation processing is digitally performed on a waveform of voltage from which an resonance frequency component, due to an angle response of the tilt mirror, has been removed, so that the non-linearity of mirror rotation angles versus control voltages (feed forward control) can be compensated for, thus realizing a high-speed, stable mirror control. In particular, since the filter and the square root calculating unit are digitalized, it is possible to facilitate control of the target angle and various parameters such as driving property information of the tilt mirror, thereby realizing stable control even with a downsized apparatus.

Further, when controlling the tilt mirror, whose tilt angle is controlled by electrostatic attraction, table calculation processing (voltage approximation) is performed on the control signal to compensate for the non-linearity of electrostatic capacities versus mirror tilt angles. As a result, linear control of the tilt mirror becomes virtually available, and mirror control is realized such that a residual resonance frequency due to the tilt mirror is sufficiently suppressed even by a downsized control apparatus and such that a high-speed and stable angle response is available.

Furthermore, by controlling a pulse wave form appearing in initial part of a tilt mirror control signal, it is possible to compensate for waveform distortion of such a pulse waveform, so that efficient mirror control is attained such that a speedy and stable angle response is realized immediately after initiation of the control.

DESCRIPTION OF THE PREFERRED EMBODIMENT(S)

Embodiments of the present invention will be described hereinbelow with reference to the relevant accompanying drawings.

Figure 1:
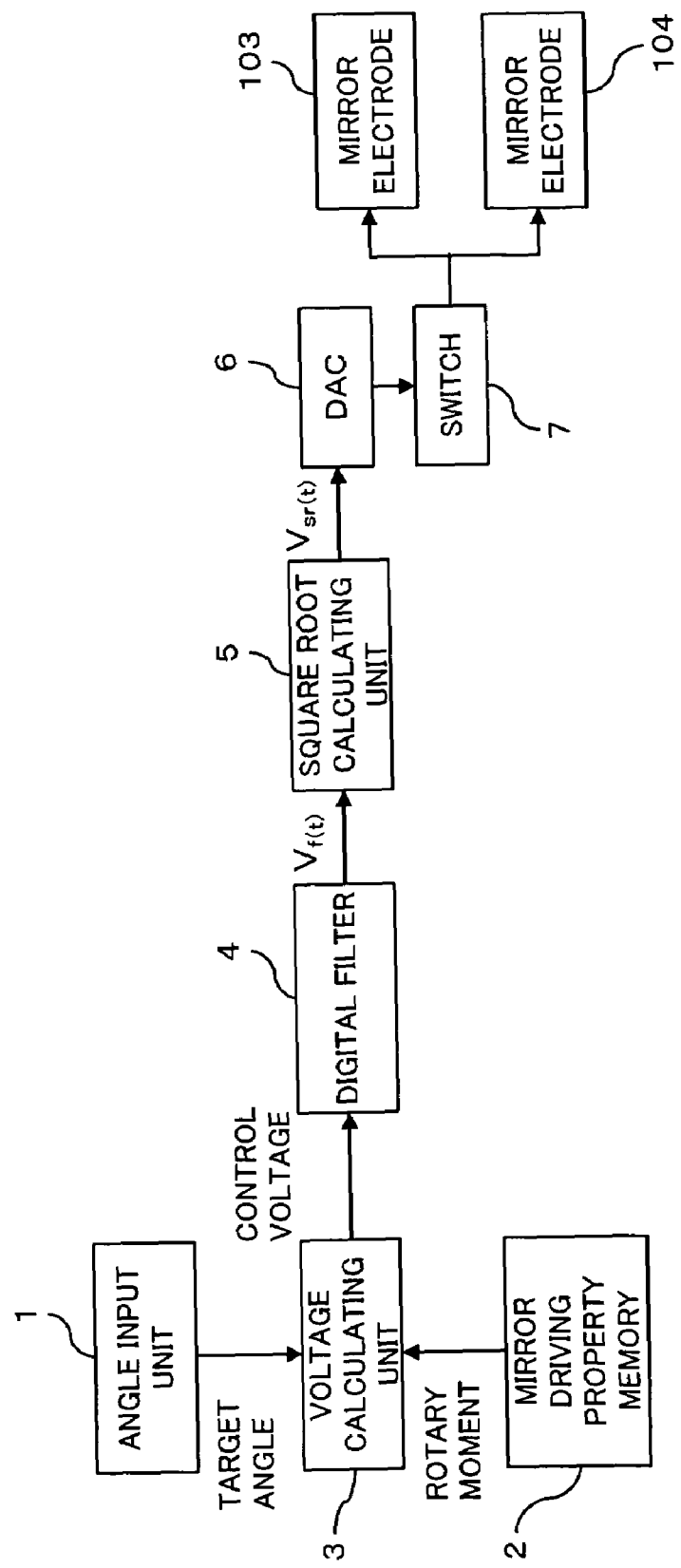
FIG. 1 is a block diagram schematically showing a tilt mirror control apparatus according to a first embodiment of the present invention.
Figure 13:
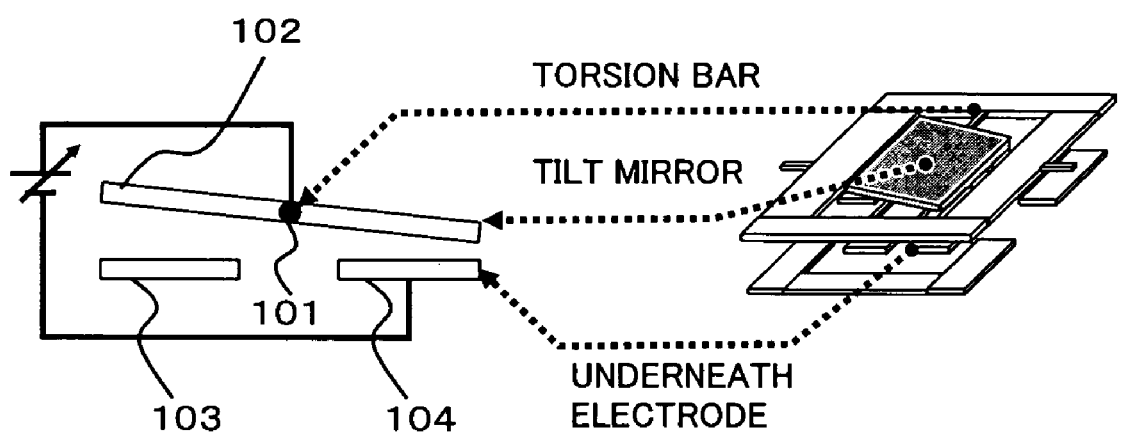
FIG. 13 is a perspective view in schematic form depicting a previously known optical tilt mirror that is actuated by electrostatic force.
Figure 14:
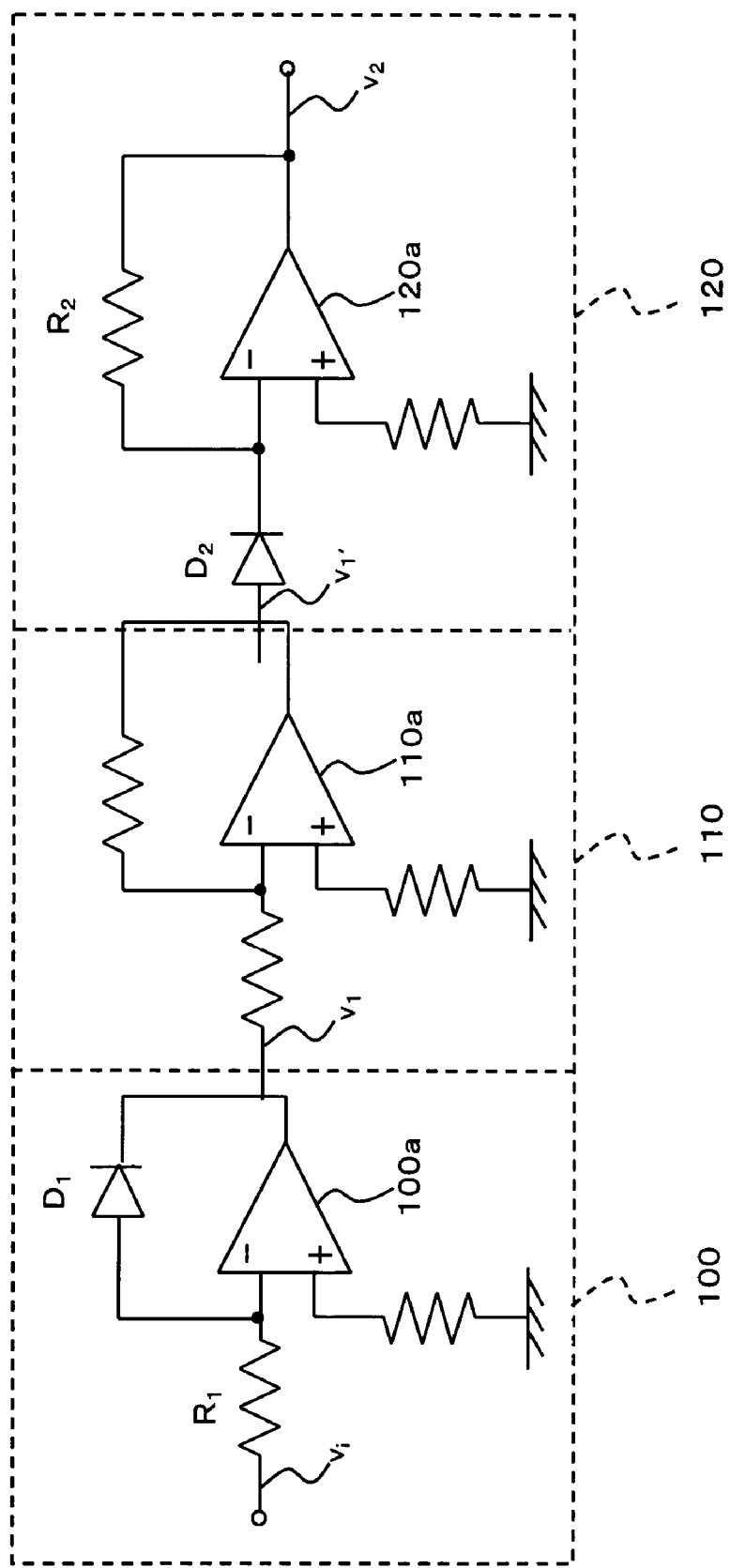
FIG. 14 is a circuit diagram illustrating a conventional square root calculation device.

[1] First Embodiment:

FIG. 1 schematically shows a tilt mirror control apparatus according to a first embodiment of the present invention. The control apparatus, for example, controls a tilt angle of the tilt mirror 102 already described with reference to FIG. 13. In the present embodiment, as shown in FIG. 1, the control apparatus has an angle input unit 1, a mirror driving property memory 2, a voltage calculating unit 3, a digital filter 4, a square root calculating unit 5, a digital to analog converter (DAC) 6, and a switch 7. Items 103 and 104 are electrodes (a plus-side electrode and a minus-side electrode) placed under the tilt mirror 102. Those electrodes are symmetrically disposed with respect to a rotation axis (torsion bar) 101 (see FIG. 13) of the tilt mirror 102.

The angle input unit 1 inputs a target tilt angle of the tilt mirror 102 as a parameter; the mirror driving property memory 2 stores, in advance, information (hereinafter called "driving property information") about mechanical properties {driving property [for instance, the rotary moment α (described later), etc.]} of the tilt mirror 102 as control parameters. Note that such information is stored separately for an individual tilt mirror 102 to be controlled. On the basis of the driving property information, the voltage calculating unit 3 corrects a control voltage in accordance with the target tilt angle of each tilt mirror 102. Here, it is also possible to store, in advance, control voltage values already corrected in accordance with such target tilt angles in the mirror driving property memory 2.

In addition, the voltage calculating unit 3 produces a control signal in the form of a driving voltage (pulse voltage) to be applied to the underneath electrodes, 103 and 104, based on a parameter (target tilt angle) input by the angle input unit 1 and a parameter (driving property information) read out from the mirror driving property memory 2.

In other words, the foregoing angle input unit 1, mirror driving property memory 2, and voltage calculating unit 3, in combination, serve as a control signal producing unit, which produces a control signal, for feed-forward controlling of the tilt mirror 102 into a target tilt angle, based on a parameter which determines the target tilt angle of the tilt mirror 102. The angle input unit 1 and the mirror driving property memory 2, in combination, serve as a parameter input unit, which inputs a target tilt angle and driving property information of the tilt mirror 102 as the aforementioned parameters.

The digital filter 4 removes a resonance frequency component, which is caused by an angle response, or a movement of the tilt mirror 102 into a desired angle, from the control voltage obtained by the voltage calculating unit 3.

Filter characteristics of the digital filter 4 will be described later. The square root calculating unit 5 digitally obtains a square root of the output of the digital filter 4, thereby compensating for non-linearity of the aforementioned driving voltage.

The DAC 6 converts the output (digital value) of the square root calculating unit 5 into an analog value, and the switch 7 selectively applies a driving voltage to either one of the electrodes, 103 and 104, depending on whether the analog value of the driving voltage is plus or minus. For instance, if the driving voltage is plus, the electrode 103 is selected. On the other hand, if the driving voltage is minus, the electrode 104 is selected.

Operation of such a control apparatus according to the first embodiment will be described hereinbelow.

First of all, in order to simulate an operation of a tilt mirror 102 (hereinafter also simply called "mirror 102"), an operation model for the mirror 102 is prepared. That is, the kinetic equation of a rotating body is expressed as $$I\frac{d^2\theta}{dt^2} + c\frac{d\theta}{dt} + k\theta = N(t) \tag{A-1}$$

where $\theta$ is a mirror tilt angle (rad); I is an inertial moment (kg·m$^2$); c is an attenuation coefficient (N·m·sec/rad); k is a spring constant (N·m/rad); N(t) is a torque (N·m) externally applied to the mirror.

Figure 2:
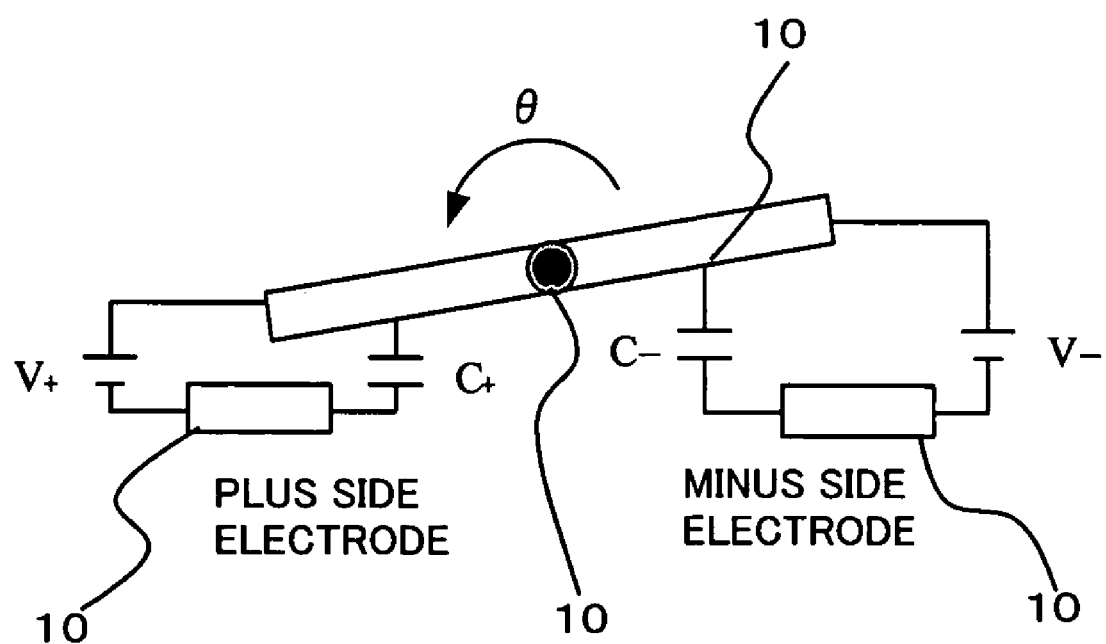
FIG. 2 is a view for describing the principle of operation of the tilt mirror according to the first embodiment of the present invention.

The plus-side electrode 103 and the minus-side electrode 104 are defined as shown in FIG. 2. Although the mirror 102 has another rotation axis extending in a direction horizontal to the papersheet surface of FIG. 2, the following description will concentrate on the other rotation axis alone, assuming that the axes are independent from each other.

Here, an electrostatic torque Ns applied to the mirror 102 is obtained by partially differentiating total electrostatic energy with respect to a mirror angle. That is, $$Ns = \frac{\partial}{\partial\theta}\left(\frac{1}{2}C_+V_+^2 + \frac{1}{2}C_-V_-^2\right) \tag{A-2}$$

where $C_+$ is an electrostatic capacity between the electrode 103 and the mirror 102; $C_-$ is an electrostatic capacity between the electrode 104 and the mirror 102; $V_+$ is a driving voltage applied to the electrode 103; and $V_-$ is a driving voltage applied to the electrode 104.

Since the mirror 102 is symmetrical with respect to its axis, a relation $(=C(\theta))$ between the electrostatic capacities is given by $$C_+(\theta) = C_-(-\theta) \tag{A-3}$$

A driving voltage is applied to either one of the electrodes, 103 and 104, to obtain a desired torque. An intermediary voltage $V_d$ is thus defined by the following formulas, (A-4) and (A-5), and one of the control variables is removed (hereinafter, if simply called "driving voltage," it means $V_d$).

$$V_+ = \begin{cases} V_d & (V_d \geq 0) \\ 0 & (V_d < 0) \end{cases} \tag{A-4}$$

$$V_- = \begin{cases} 0 & (V_d \geq 0) \\ -V_d & (V_d < 0) \end{cases} \tag{A-5}$$

Therefore, the above formula (A-2) becomes $$Ns = \frac{1}{2}\frac{\partial C(\theta)}{\partial\theta}V_+^2 - \frac{1}{2}\frac{\partial C(-\theta)}{\partial\theta}V_-^2 \tag{A-6}$$

$$= \frac{1}{2}\frac{\partial C(\theta \cdot \text{sign}(V_d))}{\partial\theta}V_d^2 \cdot \text{sign}(V_d)$$

Here, the sign function is defined by $$\text{sign}(V) = \begin{cases} \dfrac{V}{|V|} & V \neq 0 \\ 0 & V = 0 \end{cases} \tag{A-7}$$

In particular, in an area where the electrostatic capacity is linear with the tilt angle, that is, an area where the formula $$C(\theta) \approx a\theta + b$$

is satisfied, the electrostatic torque Ns can be simplified as $$Ns = \frac{1}{2}aV_d^2 \cdot \text{sign}(V_d) = \frac{1}{2}aV_d|V_d| \tag{A-8}$$

Eventually, the kinetic equation of the mirror is given by $$I\frac{d^2\theta}{dt^2} + c\frac{d\theta}{dt} + k\theta = \frac{1}{2}aV_d|V_d| \tag{A-9}$$

Here, assuming that k represents a torsion spring constant of the tilt mirror 102, the rotary moment $\alpha$ (the $\alpha$ values are stored, one for each tilt mirror 102, in the mirror driving property memory 2) is given by $$\alpha = \frac{1}{k} \times \frac{1}{2}\frac{\partial C}{\partial\theta} \tag{A-10}$$

As for a MEMS mirror, because of its narrow motion range (a range of tilt angles), the electrostatic capacity is regarded to be nearly linear with the angle, that is, $\alpha$ in the formula (A-10) can often be regarded as a constant.

In this instance, a tilt angle $\alpha$ under a condition where the mirror is stable is given by $$\theta = \alpha V^2 \tag{A-11}$$

Next, a specific operation will be described hereinbelow. When the tilt angle is changed from $\theta_0$ to $\theta_1$, an output $V_{step}(t)$ of the voltage calculating unit 3 is given by $$V_{step}(t) = \frac{1}{Vr} \times \frac{1}{\alpha}\{\theta_0 + (\theta_1 - \theta_0) \times step(t)\} \quad \text{(A-12)}$$

Here, step(t) is a unit step function, where Vr is an arbitrary constant having a voltage dimension. Assuming now that the characteristic of the digital filter 4 is represented by T(s), an output voltage $V_f(t)$ after passing through the filter 4 is given by $$V_f(t) = \frac{1}{Vr} \times \frac{1}{\alpha}\left\{\theta_0 + (\theta_1 - \theta_0) \times L^{-1}\left(\frac{T(s)}{s}\right)\right\} \quad \text{(A-13)}$$

Note that, in this formula (A-13), $L^{-1}$ represents the Laplace inverse transform.

In response to the input voltage $V_f(t)$ from the digital filter 4, the square root calculating unit 5 outputs a voltage Vsr(t) given by $$Vsr(t) = \sqrt{Vr \cdot V_f(t)} \quad \text{(A-14)}$$

Here, a torque N(t) applied to the tilt mirror 102 is given by $$N(t) = \frac{1}{\alpha}\left\{\theta_0 + (\theta_1 - \theta_0) \times L^{-1}\left(\frac{T(s)}{s}\right)\right\} \quad \text{(A-15)}$$

In this formula (A-15), since the coefficient of $$L^{-1}\left(\frac{T(s)}{s}\right)$$

is a constant, $L(N(t)) \propto T(s)/s$ is obtained. Assuming that F(s) represents the response characteristic of the mirror 102 to a torque, if the digital filter 4 is designed to have a frequency characteristic such that $F(s) \propto 1/T(s)$ is satisfied, a step-like change can be expected in mirror angle response.

Accordingly, the frequency characteristic T(s) of the digital filter 4 is then obtained. The kinetic equation in the above formula (A-1) is subjected to the Laplace transform, thereby giving $$Is^2\theta(s) + cs\theta(s) + k\theta(s) = N(s) \quad \text{(A-16)}$$

That is, the transfer function (a standardized form of this transfer function is represented by G(s)) of an electrostatic torque with respect to a mirror rotation angle is given $$\frac{\theta(s)}{N(s)} = \frac{1}{Is^2 + cs + k} = \frac{1}{I} \cdot \frac{\omega^2}{s^2 + 2\zeta\omega s + \omega^2} \quad \text{(B-1)}$$

$$\left(\omega = \sqrt{\frac{k}{I}}, \quad \zeta = \frac{c}{2\sqrt{Ik}}\right)$$

In order to approximate the angle response to a step ($\propto 1/s$), the torque N(s) should be approximately opposite in characteristic, that is, it should have a characteristic expressed as $$N(s) = (s^2 + 2\zeta\omega s + \omega^2)/s \quad \text{(B-2)}$$

That is, a filter is employed to approximate the characteristic of the torque to an ideal one. Therefore, a passive filter whose characteristic is the most approximate to $$s^2 + 2\zeta\omega s + \omega^2$$

is a notch filter (Band Elimination Filter (BEF)) having a characteristic (=T(s)) given by $$\frac{s^2 + \omega^2}{s^2 + \frac{\omega}{Q}s + \omega^2}$$

In a practical application, since the digital filter 4 is a digital filter, this transfer function is subjected to the bilinear Z transform.

Figure 4:
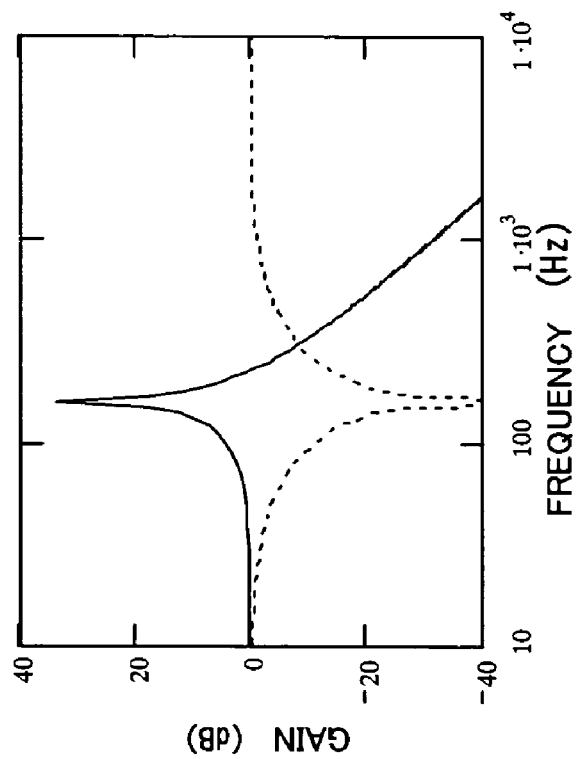
FIG. 4 shows frequency-gain characteristics of a tilt mirror and a digital filter according to the first embodiment of the present invention.

FIG. 4 plots frequency-gain characteristics of the BEF and the mirror 102. The parameters having been set are: $\omega = 2\pi \times 1000$(rad/s); $\zeta = 0.01$; and Q=0.3 (in FIG. 4, the solid line and the broken line represent the frequency-gain characteristics of the mirror and the frequency characteristics of the BEF, respectively). Note that a gain of the mirror 102 is standardized in such a manner that it takes a value of 1 where s=0.

In a control apparatus according to this embodiment, the angle input unit 1 provides a target tilt angle to the voltage calculating unit 3, which then accesses the mirror driving property memory 2 to obtain driving property information (rotary moment α). At this time, an output of the voltage calculating unit 3 has a voltage given by the foregoing formula (A-12).

After that, the voltage (calculation result) passes through the digital filter 4 where the resonance frequency due to the mirror 102 is removed, and then enters the square root calculating unit 5 where square root calculation is digitally performed. The calculation result is converted by the DAC 6 into an analog voltage, which is then applied to either one of the electrodes, 103 and 104, via the switch 7. At that time, a torque hereby applied has a waveform that suppresses the resonance frequency component due to the mirror, so that the tilt mirror 102 is speedily tilted into the target tilt angle even when a couple of electrodes, 103 and 104, are used therein.

Figure 3:
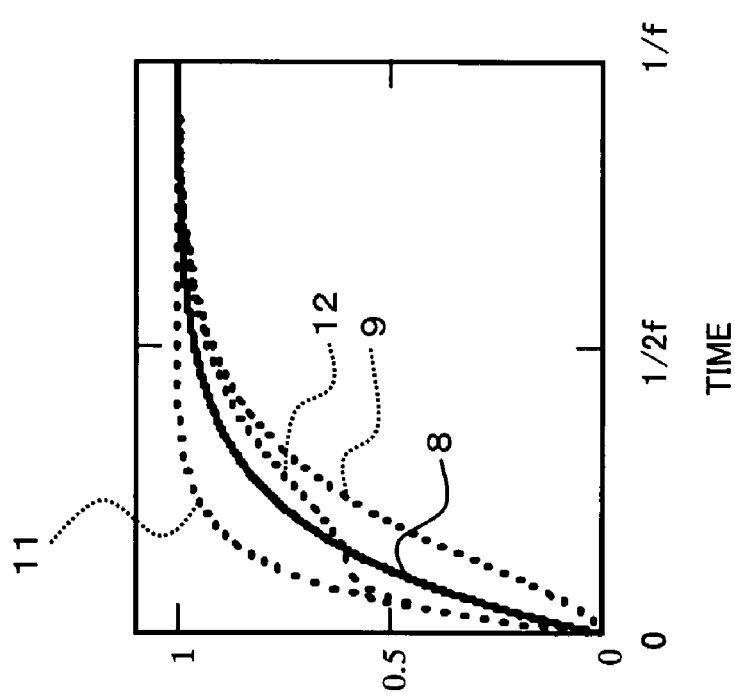
FIG. 3 shows a plot of standardized voltage versus time and also plots of standardized torque versus time, in a case where square root calculation is not employed in the first embodiment.

When a low pass filter (LPF) with a cut-off frequency f is used for filtering, without any square root calculation performed, to obtain a driving voltage, and when such a voltage $V_d$, which is plotted by the solid line 8 in FIG. 3, is applied to the electrode 103 or the electrode 104, a torque applied to the mirror 102 is distorted as shown by the broken lines, 9, 12, or 11, in FIG. 3, thereby causing a problem that a resonance frequency gain of the mirror 102 cannot be suppressed sufficiently.

In this FIG. 3, however, both the driving voltage and the torque are standardized in such a manner that their initial and final values become 0 and 1, respectively. Assuming that ΔV represents a voltage variation: the broken line 9 shows a waveform of a standardized torque when the driving voltage is changed from 0 to ΔV; the broken line 12 shows a waveform of a standardized torque when the driving voltage is changed from −ΔV/2 to +ΔV/2; the broken line 11 shows a waveform of a standardized torque when the driving voltage is changed from ΔV to 0.

In accordance with the first embodiment of the present invention, square root calculation processing is digitally performed on a waveform of voltage from which an resonance frequency component due to an angle response of the mirror 102 has been removed, so that non-linearity of mirror rotation angles versus control voltages (feed forward control) can be compensated for, thus realizing a high-speed, stable mirror control. Furthermore, in this case, since the filter 4 and the square root calculating unit 5 are both digitalized, it is possible to facilitate control of parameters such as a target angle and driving property information for the mirror 102, so that a downsized and stable control apparatus can be realized.

Application of such a control method is extremely advantageous especially when controlling multiple mirrors as tiny as MEMS mirrors, because feed back control is often difficult to be applied therein.

[2] Second Embodiment:

A second embodiment of the present invention aims to realize mirror controlling even speedier and more stable than the above first embodiment. In mirror control according to the first embodiment, there is no denying that it is still difficult to completely compensate for effects given from the non-linearity [angular dependency of the following equation (C-1)

$$\partial C/\partial \theta \quad (C\text{-}1)$$

in the right side of the foregoing formula (1)] of electrostatic capacities against mirror rotation angles (tilt angles). It thus cannot be said that a residual resonance frequency is suppressed truly sufficiently.

Figure 5:
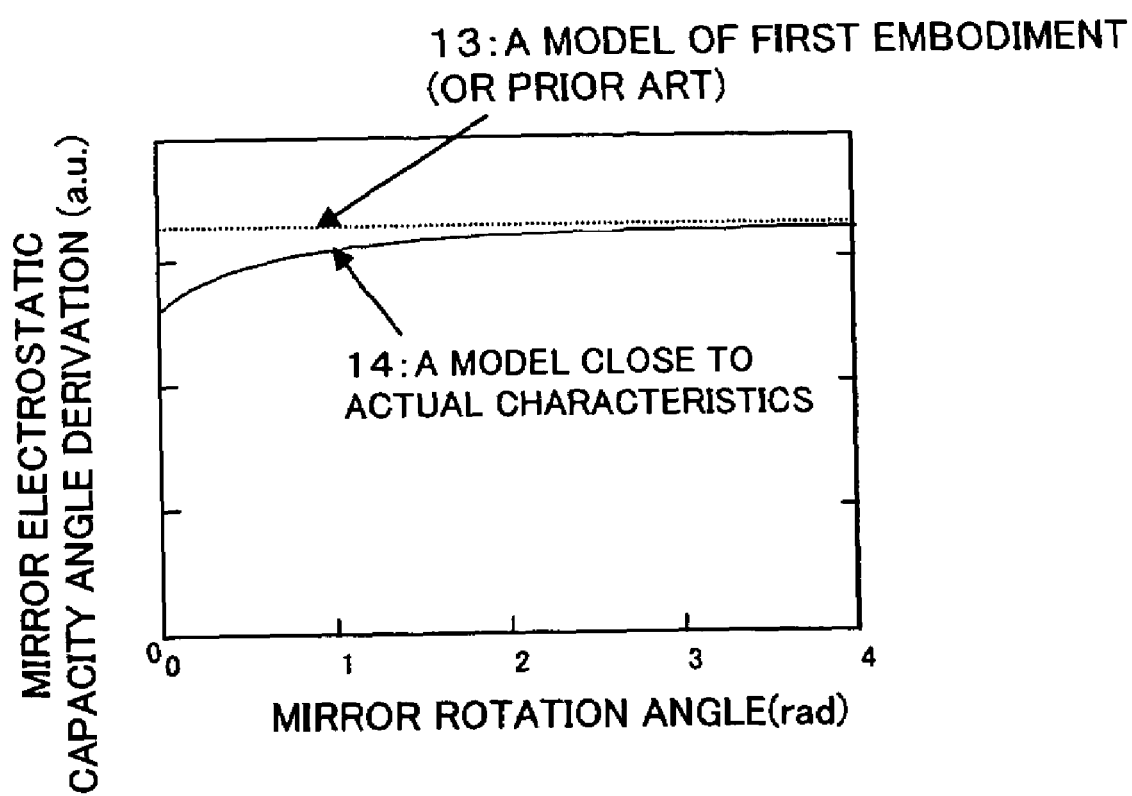
FIG. 5 is a plot of angular differentiation of mirror electrostatic capacity against mirror rotation angle according to a second embodiment of the present invention.
Figure 8:
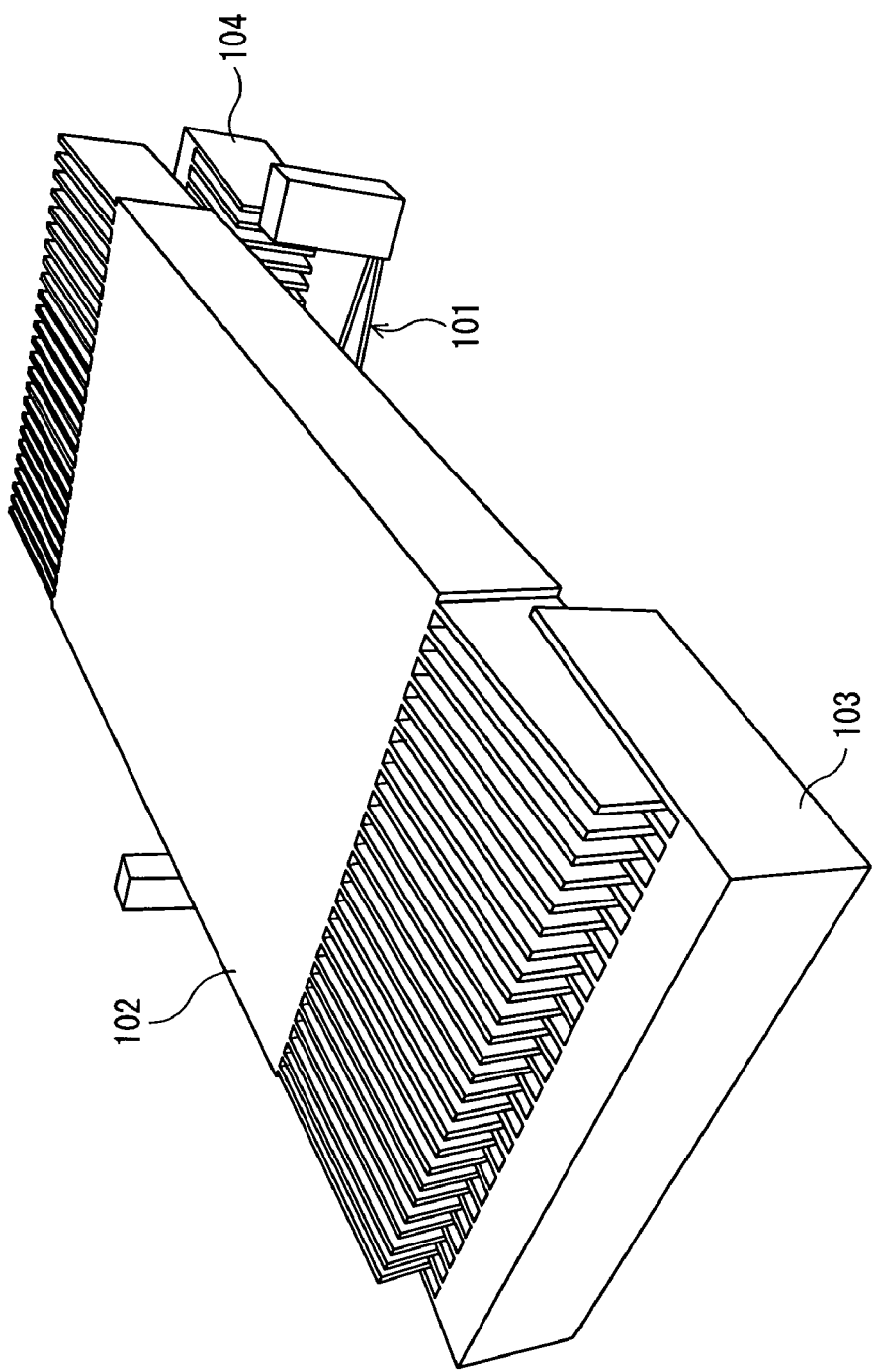
FIG. 8 is a perspective view in schematic form depicting a construction of an electrode (comb-shaped electrode) equipped to a tilt mirror according to the second embodiment.

This is because, in the first embodiment (or the conventional art), α, expressed by the formula (A-10), is regarded as a constant. As shown in FIG. 5, for example, there appears deviation (see the broken line 13 and the solid line 14) between the angular differentiation of the mirror electrostatic capacity against the mirror rotation angle and an ideal characteristic. In the second embodiment, accordingly, such deviation is made as small as possible, thereby making it possible to control the mirrors using a model that is even closer to the ideal characteristic (see the solid line 14). Here, the characteristic plotted by the solid line 14 is an example where the electrodes, 103 and 104, have such a comb-shaped construction as shown in FIG. 8.

Figure 6:
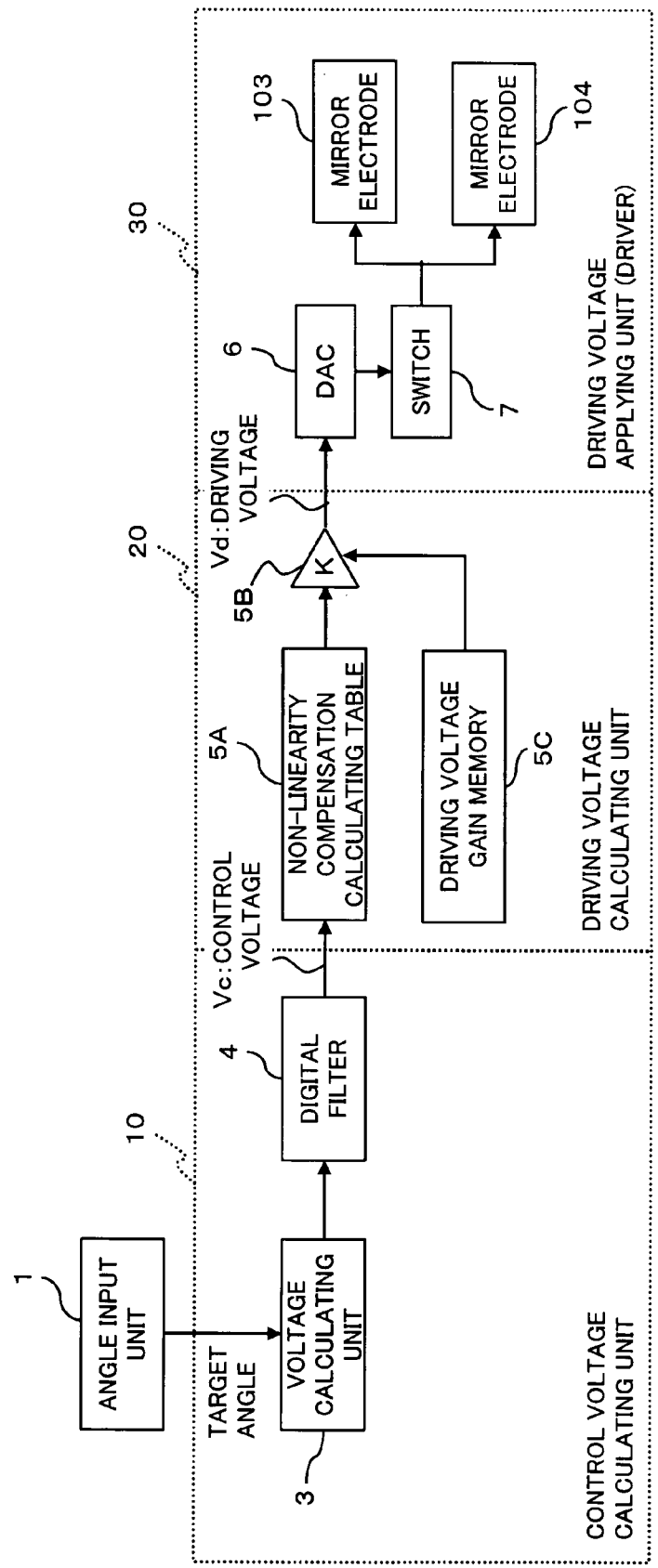
FIG. 6 is a block diagram schematically showing a tilt mirror control apparatus according to a second embodiment of the present invention.

As shown in FIG. 6, essential part of the tilt mirror control apparatus according to the second embodiment includes a control voltage calculating unit (control signal producing unit) 10, a driving voltage calculating unit (non-linearity compensation calculating unit) 20, and a driving voltage applying unit (driver) 30. The control voltage calculating unit 10 has an angle input unit 1, a voltage calculating unit 3 and a digital filter 4; the driving voltage calculating unit 20 has a non-linearity compensation calculating table 5A, a gain adjusting unit 5B, and a driving voltage gain memory 5C; the driving voltage applying unit 30 has a DAC (Digital to Analog Converter) 6, a switch 7, and (comb-shaped) electrodes (hereinafter also called "mirror electrodes"), 103 and 104.

The control apparatus in FIG. 6 differs from that in FIG. 1 in that the former has the non-linearity compensation calculating table 5A, the gain adjusting unit 5B, and the driving voltage gain memory 5C, instead of the square root calculating unit 5, which three, in combination, serve as the driving voltage calculating unit 20.

Note that the followings are the same or approximately the same as those in the first embodiment: the angle input unit 1; the voltage calculating unit 3 of the control voltage calculating unit 10; the digital filter 4; the DAC 6 of the driving voltage applying unit 30; the switch 7; and the electrodes, 103 and 104.

The non-linearity compensation calculating table 5A of the driving voltage calculating unit 20 previously stores values that are to be selectively output in response to inputs, and performs calculation for outputting one of such stored values in response to an actual input value. Here, the mirror 102 is grounded, and the mirror-to-electrode potential difference is synonymous with the electrode voltage. As in the case of the first embodiment, assuming that k represents a torsion spring constant of the tilt mirror, a rotary moment α(θ) is given by $$\alpha = \frac{1}{k} \times \frac{1}{2} \frac{\partial C}{\partial \theta} \quad (C\text{-}2)$$

At this time, a driving voltage required to obtain a tilt angle θ is given by $$V_d = \sqrt{\frac{\theta}{\alpha(\theta)}} \quad (C\text{-}3)$$

Here, it is assumed that the maximum of θ is given as $\theta_{max}$. Under a condition where the control voltage $V_c$ ranges from 0 to $Vc_{max}$, if the driving voltage $V_d$ is varied by voltage approximate calculation expressed by $$V_d = \sqrt{\frac{\theta_{max}}{Vc_{max}} V_c \bigg/ \alpha\!\left(\frac{\theta_{max}}{Vc_{max}} V_c\right)} \quad (C\text{-}4)$$

it is possible to compensate for the non-linearity of electrostatic capacities versus mirror tilt angles, thereby realizing a nearly linear relationship between a control voltage $V_c$ and a mirror tilt angle (driving voltage $V_d$).

Figure 7:
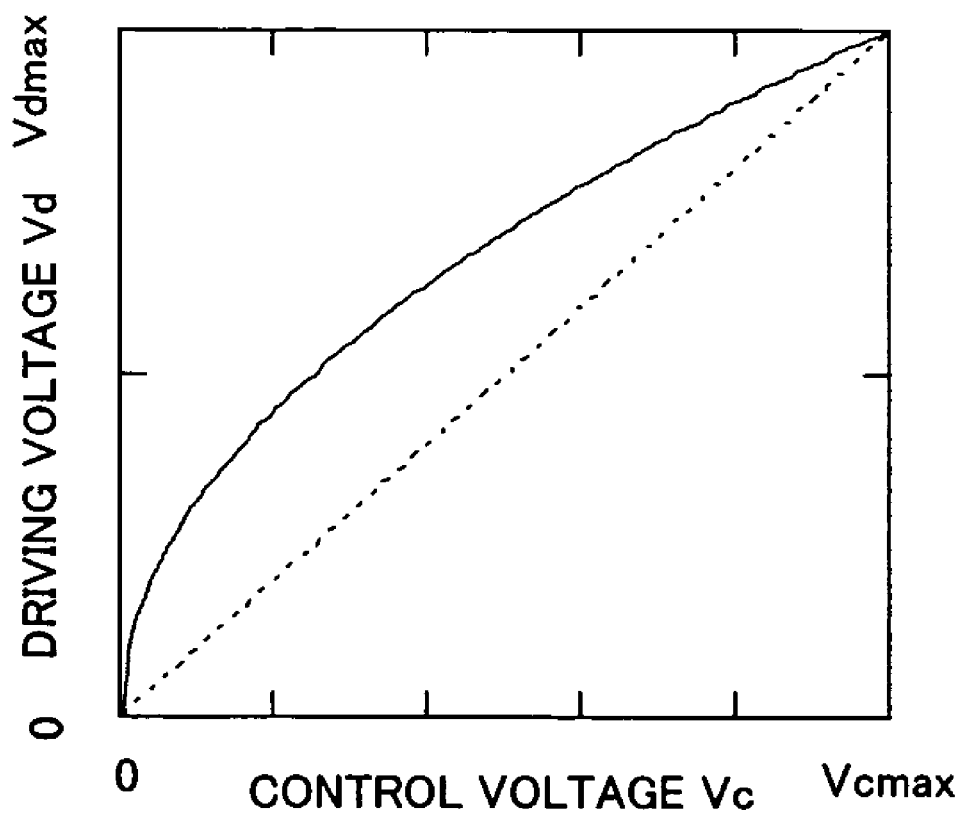
FIG. 7 is a graph (table computation graph) showing relation between input voltage (control voltage) and output voltage (driving voltage) in a non-linearity compensation calculating table of FIG. 6.

Accordingly, the non-linearity compensation calculating table 5A stores such a driving voltage $V_d$, expressed by the foregoing formula (C-4), as an output to be given in response to an input (control voltage $V_c$) from the digital filter 4. Note that FIG. 7 plots an example of input-output characteristic (a table calculation graph) of the non-linearity compensation calculating table 5A.

The gain adjusting unit 5B adjusts an output gain of the non-linearity compensation calculating table 5A using an output of the driving voltage gain memory 5C. Generally speaking, when controlling tilt mirrors, it is difficult to control the spring constant k based on the electrostatic capacity, so that a rotary moment error is often caused. If an electrostatic capacity error is not so significant in comparison with a spring constant error that it can be ignored, a spring constant that serves as a standard is decided. When the spring constant is given by $$k/\epsilon^2 (\epsilon > 0) \quad (C\text{-}5)$$

a driving voltage $V_d$ is given by $$V_d = \varepsilon\sqrt{\frac{\theta}{\alpha(\theta)}} \quad \text{(C-6)}$$

That is, using a single non-linearity compensation calculating table 5A alone, it is possible for the gain adjusting unit 5B to perform gain adjustment on two or more mirrors identical in construction, thus exerting almost the same effects on those mirrors.

Therefore, a mirror angle measuring means (not shown) previously measures $\varepsilon$ (driving voltage gain) of the foregoing formula (C-6) for each of the identically constructed mirrors 102 separately, and the driving voltage gain memory 5C stores the measured values therein. It is thus possible to control multiple mirrors 102 in an integrated way, so that a memory capacity required by the non-linearity compensation calculating table 5A is reduced, thus realizing downsized circuitry.

Here, to the foregoing mirror angle measuring means, a mechanism is applicable in which the amount of light, input from an optical fiber coming-in and then output (combined) to an optical fiber going-out via the mirror 102, is measured to obtain an angle of the light deflected by the mirror 102. With such a measurement mechanism, it is possible to correct the contents (driving voltage gain $\varepsilon$) stored in the driving voltage gain memory 5C, depending on the measurement results.

An operation of such a control apparatus according to the second embodiment will be described hereinbelow.

First of all, a driving voltage gain $\varepsilon$ is obtained by the aforementioned mirror angle measuring means for each of the mirrors 102 separately, and the obtained gain is stored in the driving voltage gain memory 5C. When angle control is actually performed, a target tilt angle is provided to the voltage calculating unit 3 through the angle input unit 1. The voltage calculating unit 3 produces a control voltage corresponding to the input target tilt angle [see the forgoing equation (A-12), for example].

After that, the output of the voltage calculating unit 3 enters the digital filter 4. As in the case of the first embodiment, the filter 4 removes a resonance frequency due to the mirror 102 from the input control voltage waveform and then inputs the result to the non-linearity compensation calculating table 5A, which then outputs an item of the contents (driving voltage $V_d$) stored therein that corresponds to the control voltage input from the digital filter 4 [see equation (C-4)].

The gain adjusting unit 5B multiplies this driving voltage $V_d$ by a driving voltage gain $\varepsilon$ input from the driving voltage gain memory 5C, thereby adjusting the gain. The output then enters the DAC 6 where the voltage waveform is converted from a step-like one into an analogue one, which is then applied to either one of the electrodes, 103 and 104, via the switch 7.

As a result, a torque to be applied to the mirror 102 becomes proportional to a control voltage $V_c$, so that the tilt mirror 102 is speedily tilted into the target tilt angle even when a couple of electrodes, 103 and 104, are used therein. In this manner, when controlling the mirror 102, whose tilt angle is controlled by electrostatic attraction, a resonance frequency component due to the mirror 102 is removed from the voltage waveform, and then, table calculation processing (voltage approximate calculation) is performed on the resultant waveform to compensate for the non-linearity of electrostatic capacities against mirror tilt angles. As a result, linear control of the mirror 102 becomes virtually available, and mirror control is realized such that a residual resonance frequency due to the mirror 102 is sufficiently suppressed by a downsized control apparatus, and such that a high-speed and stable angle response is available.

[C] Third Embodiment:

The foregoing formula (C-4) can be expressed as $$\frac{\theta}{\alpha(\theta)} = \frac{\frac{\theta_{\max}}{V_{c_{\max}}}V_c}{\alpha\left(\frac{\theta_{\max}}{V_{c_{\max}}}V_c\right)} \quad \text{(D-1)}$$

Thus, it can be approximated as $$\theta = \frac{\theta_{\max}}{V_{c_{\max}}}V_c \quad \text{(D-2)}$$

That is, $\theta \propto V_c$. This relational expression goes for where $\theta < 0$, and thus, a linear angle response to the control voltage $V_c$ is obtained. In the above example, however, a non-linear rate of change in capacity is compensated for by assuming that "the mirror 102 is in a state of equilibrium" [using the foregoing kinetic equations (A-2) and (A-3), where the equations (A-4) and (A-5) are satisfied and where $\theta > 0$ and $V > 0$]. Thus, if a voltage such that the equilibrium is disturbed is applied, or if the voltage is changed so fast that the mirror 102 cannot respond thereto in changing its angles, the above approximation cannot be established.

Figure 9:
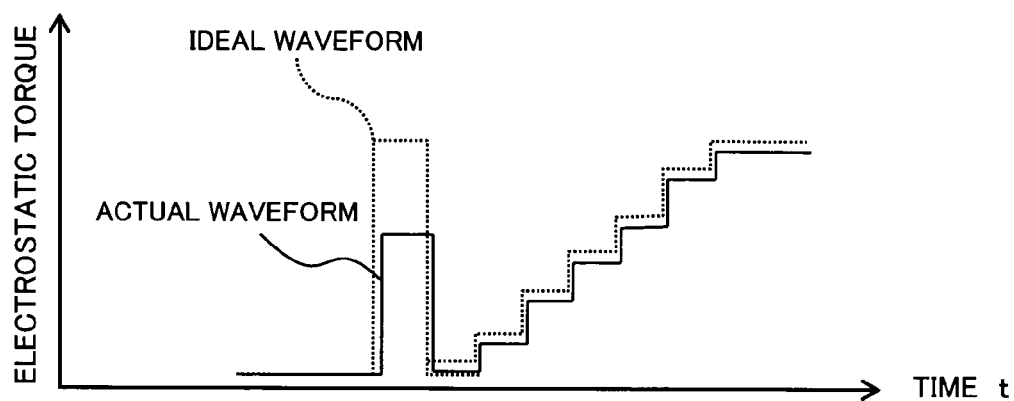
FIG. 9 is a view for describing a mirror-driving torque according to a third embodiment of the present invention, comparing its ideal values and calculated values with one another.

This causes distortion of an electrostatic torque, thereby inducing an occurrence of resonance. In particular, when high-speed step driving is performed, a short-pulse-like voltage needs to be initially applied, resulting sometimes in marked torque distortion. In a practical application of the above calculating device, resonance suppressing effects depend on varying conditions. FIG. 2 shows an example of a condition in which such insufficient resonance suppression is caused. A voltage is applied to one of the two electrodes 103 and 104 under a condition where the mirror 102 positions closer to the remaining one of the electrodes 103 and 104, so as to control a mirror angle $\theta$ in such a manner that the mirror 102 tilts to the opposite side. FIG. 9 shows a simulation of an actual torque waveform and an ideal waveform, when such a resonance-suppressing effect is insufficient, for comparison therebetween.

Figure 10:
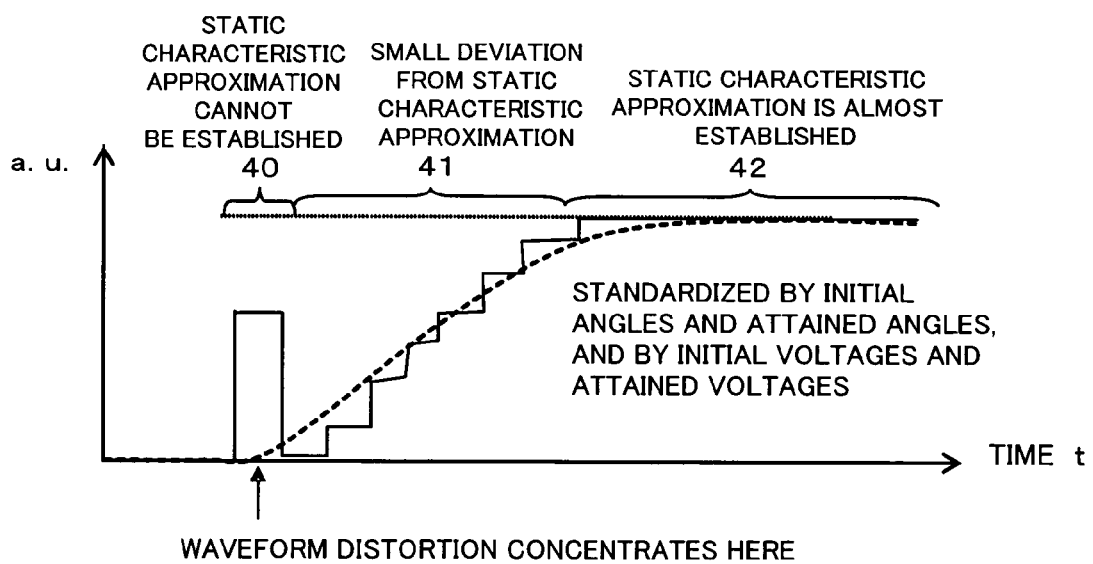
FIG. 10 is a view for describing change over time in mirror angle and driving torque according to the third embodiment.

As shown in FIG. 9, the torque waveform is distorted (the initial pulse in FIG. 9 is smaller than an ideal one). This is because the V-$\theta$ characteristic in the equilibrium state is not always be established during a transient response, so that the above-mentioned approximation (static characteristic approximation) is not established. That is, as shown in FIG. 10, the deviation from the static characteristic approximation is not significant for a time period 41; the static characteristic approximation is almost established for a time period 42; the static characteristic approximation is not established for an initial time period 40. As a result, during the time period 40, there appears significant waveform distortion in a concentrated manner. Here, in FIG. 10, the vertical axis is standardized by initial angles and attained angles of the mirror 102: the broken line indicates angles of the mirror 102; the solid line indicates change in the driving torque.

For solving this problem, it is required to compensate for variations in the rate of capacity change, by estimating a mirror angle θ at successive time points to change the control voltage accordingly. This function is difficult to be realized in the form of circuitry due to the complexity thereof. However, if the control torque has a waveform that has passed through the digital filter (BEF: Band Elimination Filter) 4, torque distortion concentrates at the leading edge of the voltage. Therefore, by simply compensating for the size of the voltage pulse, it is possible to significantly improve the waveform distortion during a transient response.

Figure 11:
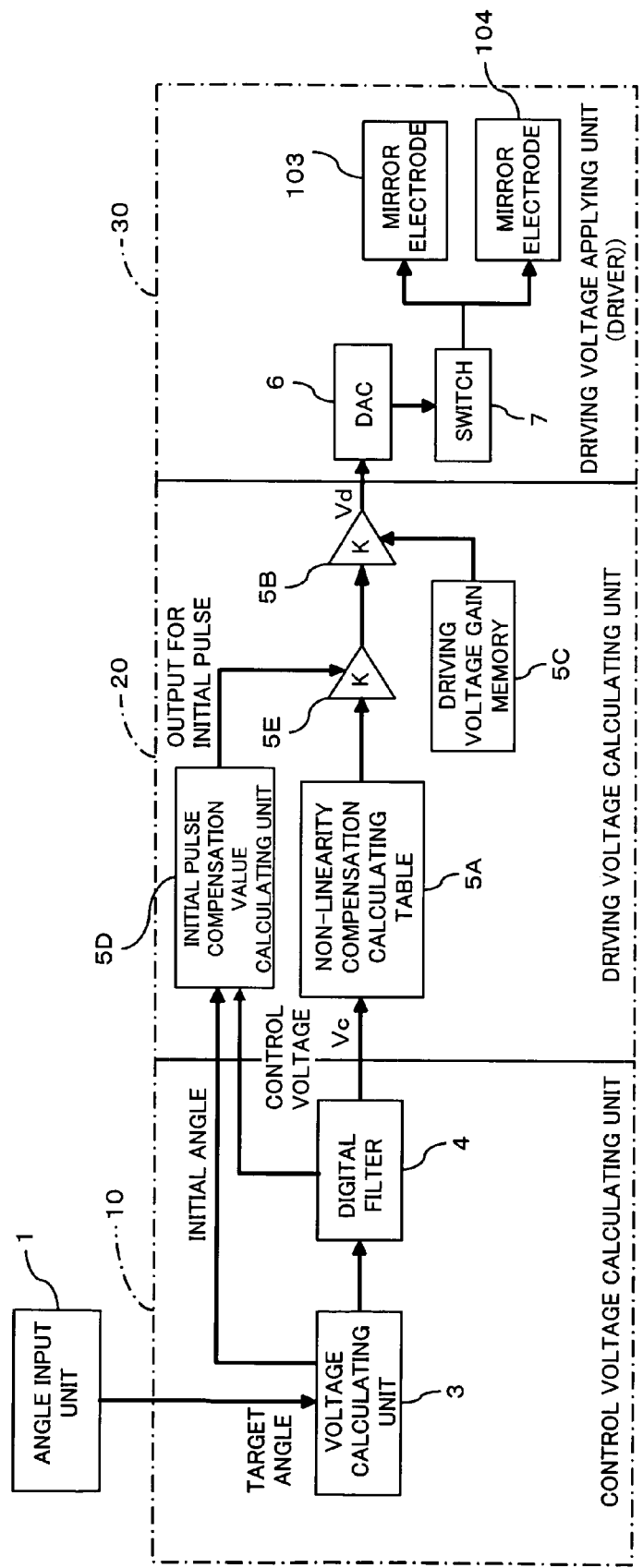
FIG. 11 is a block diagram schematically showing a construction of a tilt mirror control apparatus according to the third embodiment.

Accordingly, the control apparatus of the mirror 102 according to the present embodiment is given a construction depicted in FIG. 11. The driving voltage calculating unit 20 has an initial pulse compensation value calculating unit 5D and a gain adjusting unit 5E in addition to the above-described non-linearity compensation calculating table 5A, gain adjusting unit 5B, and driving voltage gain memory 5C. Note that like reference numbers and characters designate similar parts or elements throughout several views of the present embodiment and the conventional art, unless especially noted.

Figure 12:
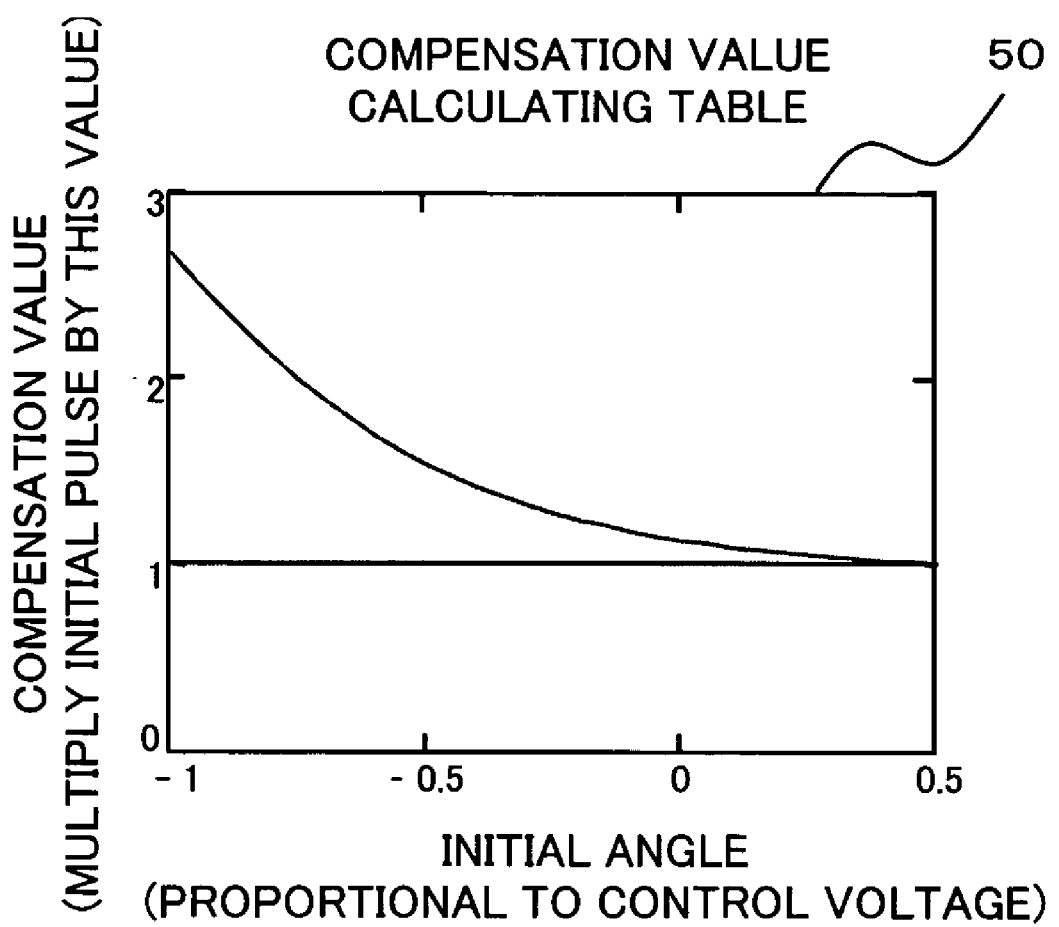
FIG. 12 shows an example of a compensation value calculating table used in the initial pulse compensation value calculating unit of FIG. 11.

Here, the initial pulse compensation value calculating unit 5D, which is connected to the voltage calculating unit 3 and the digital filter 4, outputs a compensation value that corresponds to an initial angle (the current control voltage value obtained by the voltage calculating unit 3) obtained from the voltage calculating unit 3, during a time sequence (bit counter value: one to several bits, for example) (a previously determined time sequence) beginning from a time point of the initiation of control, which time sequence is provided from the digital filter 4. The initial pulse compensation value calculating unit 5D has a compensation value calculating table 50 as shown in FIG. 12, for example.

The compensation value calculating table 50 holds compensation values proportional to initial angles (control voltages) (approximately opposite to the characteristic 14 of FIG. 5). In a practical application, when the mirror 102 is tilted (from −1° to 4° or from −0.5° to −1°, for example) to the opposite side by applying a voltage to the electrode 103 or 104, the compensation value calculating table 50 is used to compensate for a lack of torque. Here, if the mirror 102 is tilted to the opposite side to the above (from 1° to −4°), the sings (+/−) of the initial angles are inverted.

The gain adjusting unit 5E multiplies the compensation value by an output of the initial pulse compensation value calculating unit 5D, thereby compensating for the waveform distortion, as has already been described referring to FIG. 9 and FIG. 10, caused in a pulse (initial pulse) of the control voltage of the initial time period (initial part) 40.

That is, the initial pulse compensation value calculating unit 5D and the gain adjusting unit 5E, in combination, function as a pulse waveform compensating unit which controls (amplifies or attenuates) a pulse waveform appearing in initial part of a control signal obtained by the control voltage calculating unit (control signal producing unit) 10 to compensate for pulse waveform distortion in the initial part.

In the present embodiment, the driving voltage gain memory 5C stores a driving voltage gain E, which is previously obtained. A value of ε in the foregoing formula (C-6) is measured and stored for each individual mirror 102 having an identical construction. As a result, using one single square root calculating unit 5A, the gain adjusting unit 5B can perform gain control on two or more mirrors with an identical construction, and a memory capacity the non-linearity compensation calculating table 5A requires is resultantly reduced, thereby down-sizing the circuitry. As a matter of course, with no such requirement for the above measure, the gain adjusting unit 5B and the driving voltage gain memory SC do not need to be prepared. In addition, a rate of change in electrostatic capacity is calculated in advance, and the initial pulse compensation value calculating unit 5D stores, in the form of a correspondence table or the like, compensation amounts that are previously obtained according to initial angles of the mirror 102.

In a control apparatus with the above-described construction according to the present embodiment, an angle input unit 1 provides a target angle for a voltage calculating unit 3, which produces a control voltage value corresponding to the input target angle [see the foregoing formula (A-12), for example]. The control voltage value is then input to the digital filter [band elimination filter (notch filter)] 4, which, like in the first and second embodiments, removes a resonance frequency component due to the mirror 102 from the input control voltage waveform and then outputs the result [(control voltage $V_c$ (step signal)] to the non-linearity compensation calculating table 5A. The non-linearity compensation calculating table 5A outputs a driving voltage $V_d$ corresponding to the control voltage $V_c$ received from the digital filter 4 [see the formula (C-4)].

In the mean time, the digital filter 4 provides the initial pulse compensation value calculating unit 5D with a time sequence from the control start point. The initial pulse compensation value calculating unit 5D outputs a compensation value (an amount to be amplified or attenuated) corresponding to the initial angle, based on the compensation value calculating table 50, to the gain adjusting unit 5E only during a predetermined time sequence, and multiplies the output of the non-linearity compensation calculating table 5A by the compensation value.

In this manner, the waveform of an initial pulse of the control voltage (step signal) is controlled (amplified or attenuated) so that the waveform distortion is successfully compensated for. As in the case of the second embodiment, after this compensation, the gain adjusting unit 5B multiplies the resultant control voltage by a driving voltage gain ε obtained from the driving voltage gain memory 5C, thereby adjusting the gain. After that, the control voltage is input to the DAC 6, where the step-like voltage waveform is converted into an analogue waveform, and then applied to the electrode, 103 or 104. As a result, since a torque proportional to the control voltage is applied to the electrode, 103 or 104, the mirror 102 tilts into a predetermined angle immediately, showing a stable motion soon after the beginning of control.

In the above example, the output of the non-linearity compensation calculating table 5A is compensated for using a compensation value obtained by the initial pulse compensation value calculating unit 5D. However, the present invention should by no means be limited to this, and the following is also applicable. The initial pulse compensation value calculating unit 5D receives an output of the digital filter 4 during the above-mentioned predetermined time period to perform initial pulse compensation, and outputs the result to the gain adjusting unit 5B. Upon elapse of the above-mentioned predetermined time period, the non-linearity compensation calculating table 5A receives the output of the digital filter 4 and carries out the remainder of the control voltage pulse compensation.

The present invention should by no means be limited to the above-illustrated embodiment, and various changes or modifications may be suggested without departing from the gist of the invention.

What is claimed is:

1. An apparatus which controls tilting of a tilt mirror, said apparatus comprising:
    a control signal producing unit which produces a control signal, for feed-forward controlling of the tilting of said mirror, based on a parameter that determines a target tilt angle of said tilt mirror;
    a digital filter that removes a resonance frequency component, which is caused by movement of said tilt mirror into a desired angle, in said control signal, which is produced by said control signal producing unit; and
    a square root calculating unit that performs digital square-root calculation so as to compensate for non-linearity of said control signal, from which said resonance frequency component has been removed.

2. An apparatus as set forth in claim 1, wherein said control signal producing unit includes:
    a parameter input unit which inputs said parameter as said target tilt angle and driving property information of said tilt mirror; and
    an arithmetic operation unit which obtains said control signal by arithmetic operation based on said target tilt angle and said driving property information of said tilt mirror, both of which are input by said parameter input unit.

3. An apparatus as set forth in claim 2, said apparatus further comprising:
    a plurality of electrodes arranged for each said tilt mirror; and
    a switch that selects, based on said control signal, one of said plurality of electrodes to which said control signal is provided.

4. An apparatus as set forth in claim 2, wherein said tilt mirror is an MEMS (Micro Electro Mechanical Systems) mirror.

5. An apparatus as set forth in claim 3, wherein said tilt mirror is an MEMS (Micro Electro Mechanical Systems) mirror.

6. An apparatus as set forth in claim 1, said apparatus further comprising:
    a plurality of electrodes arranged for each said tilt mirror; and
    a switch that selects, based on said control signal, one of said plurality of electrodes to which said control signal is provided.

7. An apparatus as set forth in claim 6, wherein said tilt mirror is an MEMS (Micro Electro Mechanical Systems) mirror.

8. An apparatus as set forth in claim 1, wherein said tilt mirror is an MEMS (Micro Electro Mechanical Systems) mirror.

9. A method for controlling tilting of a tilt mirror, said method comprising the steps of:
    producing a control signal, for controlling the tilting of said mirror, based on a parameter which determines a target tilt angle of said tilt mirror;
    removing a resonance frequency component, which is caused by movement of said tilt mirror into a desired angle, from said control signal by a digital filter; and
    performing digital square-root calculation so as to compensate for non-linearity of said control signal.

10. An apparatus which controls tilting of a tilt mirror which is controlled by electrostatic attraction, said apparatus comprising:
    a control signal producing unit which produces a control signal, for controlling the tilting of said mirror, based on a parameter that determines a target tilt angle of said tilt mirror; and
    a non-linearity compensation calculating unit which performs voltage approximate calculation so as to compensate for non-linearity, in said control signal obtained by said control signal producing unit, of electrostatic capacity against said tilt angle of said tilt mirror, a driving signal for driving said tilt mirror being thereby produced.

11. An apparatus as set forth in claim 10, wherein said non-linearity compensation calculating unit includes a non-linearity compensation calculating table which stores, as result of such voltage approximate calculation, voltage $V_d$ of said driving signal given by:

$$V_d = \sqrt{\frac{\theta_{max}}{Vc_{max}} V_c \Big/ \alpha\Big(\frac{\theta_{max}}{Vc_{max}} V_c\Big)}$$

where $V_c$ represents a voltage of said control signal; $Vc_{max}$ represents a maximal value of the voltage of said control signal; $\theta_{max}$ is a maximal value of said tilt angle.

12. An apparatus as set forth in claim 11, wherein said non-linearity compensation calculating unit further includes:
    a gain information storing unit which stores gain information, one information item for each of said plurality of tilt mirrors having an identical construction, each said information item compensating for a spring constant error of a corresponding one of said plurality tilt mirrors; and
    a gain adjusting unit which adjusts an output gain of said non-linearity compensation calculating table based on said gain information stored in said gain information storing unit.

13. An apparatus as set forth in claim 12, wherein said control signal producing unit has a digital filter which removes, from the control signal, a resonance frequency component caused by movement of said tilt mirror into a desired angle.

14. An apparatus as set forth in claim 12, wherein said tilt mirror is an MEMS (Micro Electro Mechanical Systems) mirror.

15. An apparatus as set forth in claim 13, wherein said tilt mirror is an MEMS (Micro Electro Mechanical Systems) mirror.

16. An apparatus as set forth in claim 11, wherein said control signal producing unit has a digital filter which removes, from the control signal, a resonance frequency component caused by movement of said tilt mirror into a desired angle.

17. An apparatus as set forth in claim 16, wherein said tilt mirror is an MEMS (Micro Electro Mechanical Systems) mirror.

18. An apparatus as set forth in claim 11, wherein said tilt mirror is an MEMS (Micro Electro Mechanical Systems) mirror.

19. An apparatus as set forth in claim 10, wherein said control signal producing unit has a digital filter that removes, from the control signal, a resonance frequency component, which is caused by movement of said tilt mirror into a desired angle.

20. An apparatus as set forth in claim 19, wherein said tilt mirror is an MEMS (Micro Electro Mechanical Systems) mirror.

21. An apparatus as set forth in claim 10, wherein said tilt mirror is an MEMS (Micro Electro Mechanical Systems) mirror.

22. An apparatus as set forth in claim 21, such MEMS tilt mirror having a comb-shaped electrode to receive said driving signal.

23. A method for controlling tilting of a tilt mirror which is controlled by electrostatic attraction, said method comprising the steps of:

producing a control signal, for controlling the tilting of said mirror, based on a parameter which determines a target tilt angle of said tilt mirror; and performing voltage approximate calculation so as to compensate for non-linearity, in said produced control signal of electrostatic capacity against said tilt angle of said tilt mirror, a driving signal for driving said tilt mirror being thereby produced.

24. An apparatus which controls tilting of a tilt mirror which is controlled by electrostatic attraction, said apparatus comprising:

a control signal producing unit which produces a control signal for controlling the tilting of said mirror; and a pulse waveform compensation unit which controls and compensates for a pulse waveform that appears in an initial part of the control signal, which is produced by said control signal producing unit.

25. An apparatus as set forth in claim 24, further comprising a band elimination filter, disposed between said control signal producing unit and said pulse waveform compensation unit, which filter removes, from the control signal, a resonance frequency component caused by movement of said tilt mirror into a desired angle and produces a step signal, said pulse waveform compensation unit controlling only the pulse waveform which appears in the initial part of the step signal.

26. An apparatus as set forth in claim 25, wherein said band elimination filter is a digital filter.

27. An apparatus as set forth in claim 24, wherein said tilt mirror is an MEMS (Micro Electro Mechanical Systems) mirror.

28. An apparatus as set forth in claim 25, wherein said tilt mirror is an MEMS (Micro Electro Mechanical Systems) mirror.

29. An apparatus as set forth in claim 26, wherein said tilt mirror is an MEMS (Micro Electro Mechanical Systems) mirror.

30. A method for controlling tilting of a tilt mirror, said method comprising the steps of:

producing a control signal for controlling the tilting of said mirror; and controlling and compensating for a pulse waveform appearing in an initial part of the produced control signal.

31. An apparatus which controls tilting of a tilt mirror, the apparatus comprising:

means for producing a control signal, for feed-forward controlling of the tilting of the mirror, based on a parameter that determines a target tilt angle of the tilt mirror;

means for removing a resonance frequency component, which is caused by movement of the tilt mirror into a desired angle, in the produced control signal; and means for performing digital square-root calculation so as to compensate for non-linearity of the control signal, from which the resonance frequency component has been removed.

32. An apparatus which controls tilting of a tilt mirror which is controlled by electrostatic attraction, the apparatus comprising:

means for producing a control signal for controlling the tilting of the mirror; and means for controlling and compensating for a pulse waveform that appears in an initial part of the produced control signal.

33. An apparatus for controlling tilting of a tilt mirror which is controlled by electrostatic attraction, the apparatus comprising:

means for producing a control signal for controlling the tilting of the mirror, based on a parameter which determines a target tilt angle of the tilt mirror; and means for performing voltage approximate calculation so as to compensate for non-linearity, in the produced control signal, of electrostatic capacity against the tilt angle of the tilt mirror, to thereby produce a driving signal for driving the tilt mirror.

* * * * *

UNITED STATES PATENT AND TRADEMARK OFFICE
CERTIFICATE OF CORRECTION

PATENT NO.         : 6,995,896 B2
APPLICATION NO. : 10/823549
DATED                 : February 7, 2006
INVENTOR(S)       : Tetsuji Yamabana et al.

It is certified that error appears in the above-identified patent and that said Letters Patent is hereby corrected as shown below:

Column 18,
Line 35, delete "plurality" and insert -- plurality of --.

Column 19,
Line 18, delete "signal" and insert -- signal, --.

Signed and Sealed this

Fourth Day of July, 2006

JON W. DUDAS
*Director of the United States Patent and Trademark Office*